United States Patent [19]

Ehrlich

[11] Patent Number: 4,869,019
[45] Date of Patent: Sep. 26, 1989

[54] AEROPONIC APPARATUS

[76] Inventor: Karl F. Ehrlich, C.P. 375 N. Hatley, Quebec, Canada, J0B 2C0

[21] Appl. No.: 123,869

[22] Filed: Nov. 23, 1987

[30] Foreign Application Priority Data

Nov. 24, 1986 [GB] United Kingdom ............... 8628078

[51] Int. Cl.⁴ ............................................. A01G 25/00
[52] U.S. Cl. ......................................... 47/62; 47/59; 47/79; 47/82
[58] Field of Search .................. 47/59, 60, 62, 63, 64, 47/79, 80, 82, 83

[56] References Cited

U.S. PATENT DOCUMENTS

| | | |
|---|---|---|
| 421,847 | 8/1880 | Leroux . |
| 3,812,616 | 5/1974 | Koziol ................................ 47/17 |
| 3,931,695 | 1/1976 | Widmayer ........................ 47/59 X |
| 4,057,933 | 11/1977 | Enyeart ............................. 47/62 X |
| 4,059,922 | 11/1977 | Digiacinto ........................ 47/64 X |
| 4,075,852 | 2/1978 | Jones ................................... 47/64 |
| 4,076,431 | 2/1978 | Burvall ............................. 47/17 X |
| 4,209,943 | 7/1980 | Moeller et al. ................... 47/59 X |
| 4,332,105 | 6/1982 | Nir . |
| 4,514,930 | 5/1985 | Schorr et al. .................... 47/63 X |

Primary Examiner—Robert A. Hafer
Assistant Examiner—Sam Rimell
Attorney, Agent, or Firm—Steele, Gould & Fried

[57] ABSTRACT

A self-contained aeroponic apparatus comprising a reservoir for containing a nutrient solution and a right-angular plant support standing over the upper edge of the reservoir and defining with it a closed chamber. The panels that form the plant support are releasably secured, along edges thereof that adjoin one another, in essentially watertight and light-tight conditions. Likewise, the lower edges of the support panels are releasably secured to the upper edge of the reservoir in watertight and light-tight conditions. Cups for holding plant structures are formed integrally with the inclined hypotenuse wall of the right-angular support. They are open-ended tapered tubes each of a size to snugly hold a plant structure. A nutrient solution spraying system within the chamber serves to supply the solution to the plant structures in the cups. It comprises spraying heads distributed at different levels along the backwall of the plant support; a pump in the reservoir and piping operatively joining the spraying heads and the pump to allow feeding nutrient solution to the spraying heads.

6 Claims, 5 Drawing Sheets

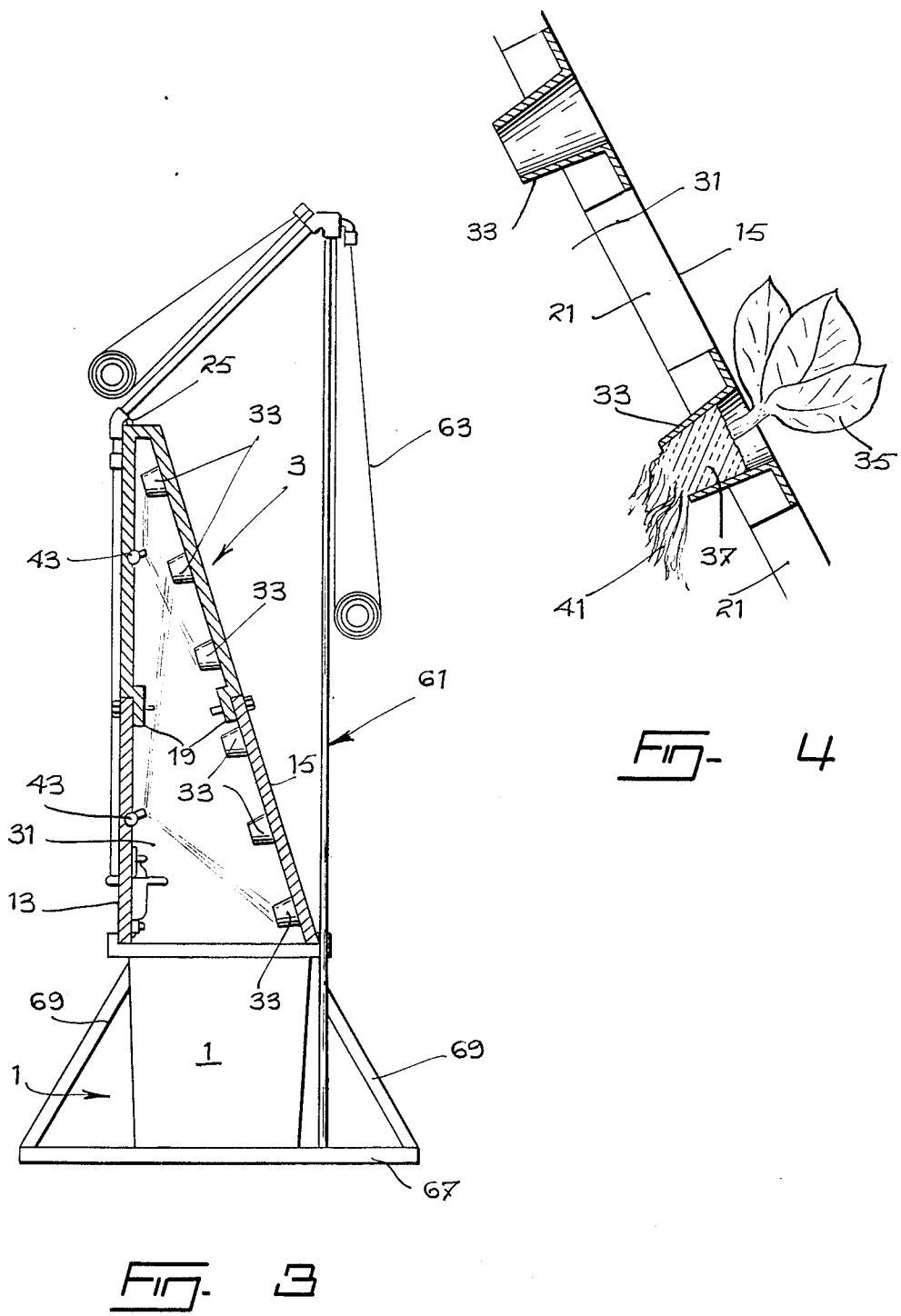

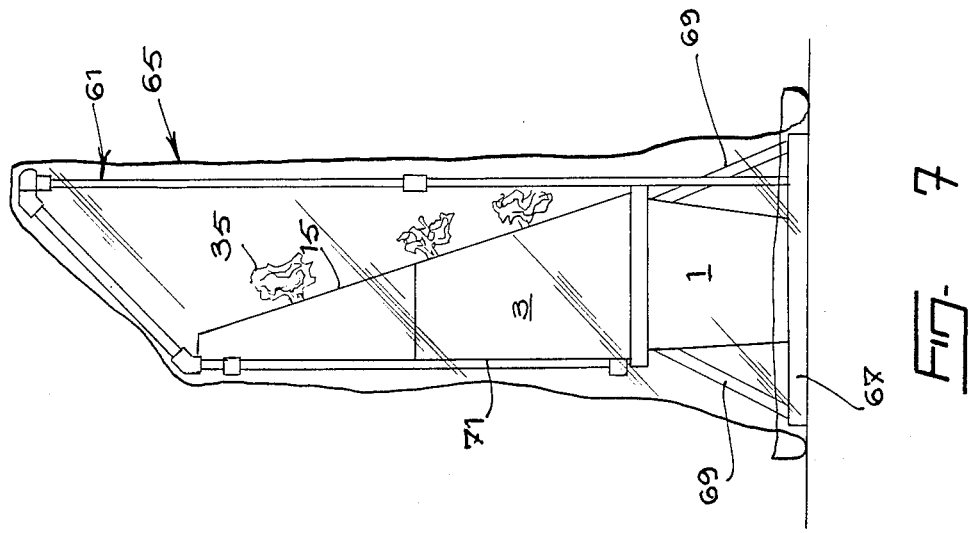
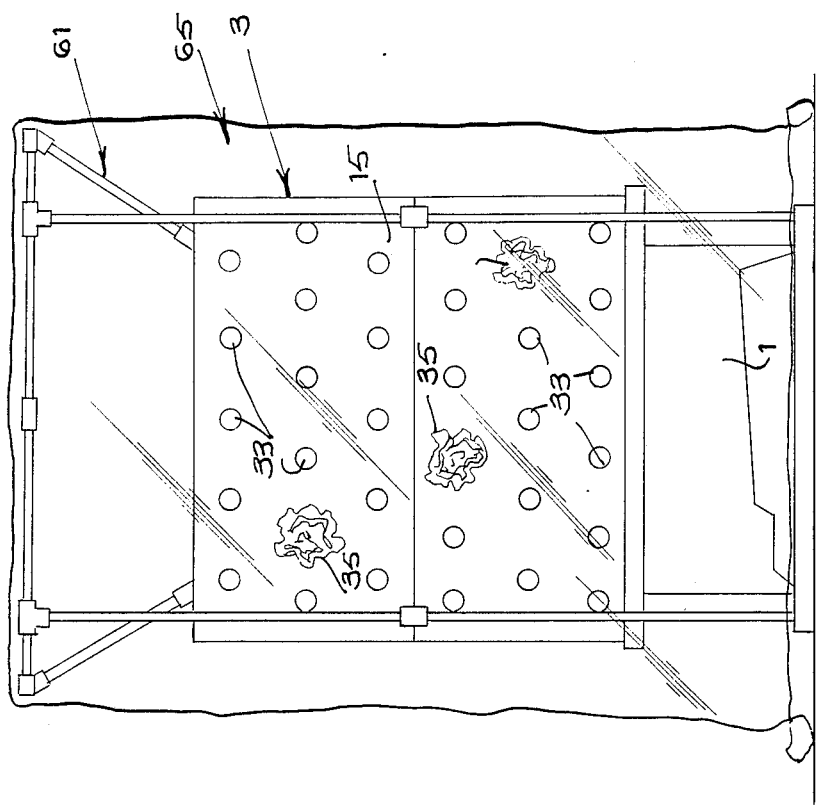

AEROPONIC APPARATUS

BACKGROUND OF THE INVENTION

1. Field of the invention

The present invention relates to an aeroponic apparatus, that is, to an apparatus adapted for soilless agriculture where the roots of plants are suspended in the air and are sprayed or misted with a nutrient solution. The spraying of solution in the air, combined with plant transpiration, serves to increase ambient humidity, particularly in dry environments as during dry seasons.

2. Description of the prior art

The growth of plants by aeroponic technique is not new. Thus, the subject has been treated in the following publications.

In an article by F. MASSANTINI in Soilless Culture (1985) pp. 85–96, entitled: "The light and dark sides of aeroponics";

In an article by B. VESTERGAARD in Proceedings of the International Society on Soilless Culture, (1984), pp. 723–738, entitled "Oxygen supply to the roots in different hydroponic systems", and In a book entitled "Hydroponic Food Production" (1981), Woodbrige Press, Santa Barbara, California, 335 p.

The patent literature is also replete with patents on various apparatuses and methods for hydroponic or aeroponic plant production.

Of particular interest, with respect to the present invention, is U.S. Pat. No. 4,059,922, issued on Nov. 29, 1977, which discloses a hydroponic grower wherein potted plants are held in two inclined wall panels of an A-frame. This grower uses a single spray jet which is located at the bottom of a tank containing a nutrient solution. As the roots of the plants grow and develop, they create flossy curtains which hinder the passage of water spray and prevent it from reaching the smaller root structures of more recently potted plants. The use of a single spray jet further restricts the available height and the usefulness of the A-frame. Also, the high pressure necessary for the solution spray to reach the upper root structures, after having penetrated the aforesaid root curtains, is physically detrimental to the root structures of the plants located at a lower level, that is closer to the outlet of the spray head.

Additionally, the A-frame of U.S. Pat. No. 4,059,922 has the bottom edges of the confining walls sit directly at the bottom of the tank of nutrient solution of which the border thus becomes exposed to direct light and rapidly gives rise to algal growth. These algae are green to black, in color, and particularly unsightly. Furthermore, they feed on the nutrient solution and therefore the latter has to be changed frequently. With respect to exposition to direct light, it may be noted that a large aperture has to be provided through one of the A-frame walls, presumably to give access to the pump. This aperture allows light directly on the mass of nutrient solution, causing algal growth directly on the plant roots thereby reducing plant growth.

The A-frame, in this patent, is made of two parts which sit one over the other with no special means being provided to ensure tightness tending to prevent leakage of nutrient solution along the joints and consequently rapid formation of unsightly algae as well as salt deposit. Lack of such fastening provision further structurally weakens the A-frame. In this regard, there is also no mention of any structural support providing stability in windy environment and failing to take into consideration the increase in weight of the apparatus as the plants grow.

The watering system, in this U.S. patent, does not appear to be provided with any protection against clogging by peat, salt, dirt or organic accumulation which can rapidly clog it. Failure of the watering system of course causes rapid loss of the plants unless excessively frequent maintenance is implemented.

Additional examples of prior art devices for aeroponics or hydroponics are to be found in the following U.S. patents:

119,242 - 800,306 - 1,181,145 1,245,441 - 1,915,884 - 2,062,755 2,121,461 - 2,150,257 - 2,152,254 2,198,150 - 2,244,686 - 2,296,860 2,306,027 - 2,411,681 - 2,431,890 2,592,476 - 2,777,253 - 2,854,762 2,855,725 - 2,928,211 - 2,952,096 2,963,819 - 3,095,670 - 3,123,304 3,305,968 - 3,323,253 - 3,352,057 3,424,231 - 3,478,817 - 3,532,437 3,578,245 - 3,667,157 - 3,768,201 3,841,023 - 3,861,519 - 3,892,982 3,915,384 - 3,951,339 - 3,992,809 4,004,612 - 4,014,135 - 4,035,950 4,051,626 - 4,057,933 - 4,075,785 4,107,875 - 4,332,105

French Patent Nos.

64,338 - 857,501 - 1,170,246 1,400,547

British Patent No. 4,469

U.S.S.R. No. 308,715.

Other U.S. patents of lesser interest are Nos. 3,667,158; 4,218,847 and 4,514,930.

SUMMARY OF THE INVENTION

The present invention overcomes the deficiencies above noted of the prior art by providing a self-contained aeroponic apparatus which is essentially watertight as well as essentially light-tight so as not to give rise to the formation of algae by contact of the nutrient solution with daylight. For the same purpose and to add further strength to the structure, the cups intended to hold the plants, contained in plugs of cellular material, are open-ended tapered tubes formed integrally with the light-exposed wall of apparatus and are inclined toward the lower reservoir of nutrient solution thereby facilitating appropriate drainage back to the reservoir.

Further according to the invention and to ensure a more efficient spraying of the plant-holding cups, as well as for floor space economy, the plant support is right-angular in vertical cross-section, including a vertical back wall and a hypotenuse front wall having the tubular cups. The spraying heads, feeding the roots of the plants, are located at different levels along the vertical back wall, operatively facing the plant roots, so that the detrimental "curtain" feature aforesaid may be avoided thereby ensuring appropriate wetting of all plant roots. Preferably, the invention provides for a filter in the nutrient solution spraying system to prevent it from clogging.

More specifically, the invention provides a self-contained aeroponic apparatus comprising:

a reservoir for containing a liquid nutrient solution, the reservoir having a bottom wall and upright circumscribing sidewalls;

a right-angular plant support standing over the reservoir; the support comprising: a rectangular planar vertical back wall; a rectangular planar inclined hypotenuse front wall and right-angular planar end walls located between the back wall and front wall at the end edges thereof;

means releasably securing together, in essentially watertight and light-tight conditions, edges of the support walls adjoining one another;

means releasably securing together, in essentially watertight and light-tight conditions, lower edges of the support and adjoining upper edges of the reservoir; the reservoir and the plant support defining an enclosure;

a plurality of cups extending within the enclosure from the front wall and being inclined toward the reservoir, the cups being formed integrally with the front wall and being open-ended tubes each adapted to snugly hold, in use, a plant held by a plant support medium; and a nutrient solution spraying system within the enclosure, the system comprising: a plurality of spraying heads distributed at different levels along the backwall and operatively facing the plant holding cups; a pump in the reservoir, and piping means operatively joining the spraying heads and the pump; the system being constructed to supply nutrient solution from the reservoir to the spraying heads.

In a preferred form, the piping means comprise two horizontal pipe branches secured to the back wall, the spraying heads being mounted on these pipe branches.

For outdoor use or for use in a solarium or the like where the temperature may be cool, a heater may advantageously be provided in the reservoir of nutrient solution. The apparatus may additionally be provided with a greenhouse enclosure frame extending above the back wall and forwardly of the front wall and a transparent plastic sheet slid over the enclosure frame and wholly enclosing the plant support and reservoir to form therewith a greenhouse.

When used outside in windy weather and/or under scorching sun, the apparatus may have a windshield assembly which includes the above greenhouse enclosure frame, and a rollable windshield made of transparent, tinted if need be, flexible plastic material rollable between a position shielding the front wall and a retracted position away from the said front wall.

Further features and other advantages of the invention will appear from the description that follows of a preferred embodiment, having reference to the appended drawings.

BRIEF DESCRIPTION OF THE DRAWINGS

FIG. 3 is an end view of the apparatus with the plant support shown in cross-section;

FIG. 4 is an end view, partly in cross-section, on an enlarged scale of a portion of the plant-holding front wall of the apparatus;

FIGS. 6 and 7 are, respectively, a front elevation view and an end view of the apparatus provided with a greenhouse enclosure.

DESCRIPTION OF THE PREFERRED EMBODIMENT

Figure 1:
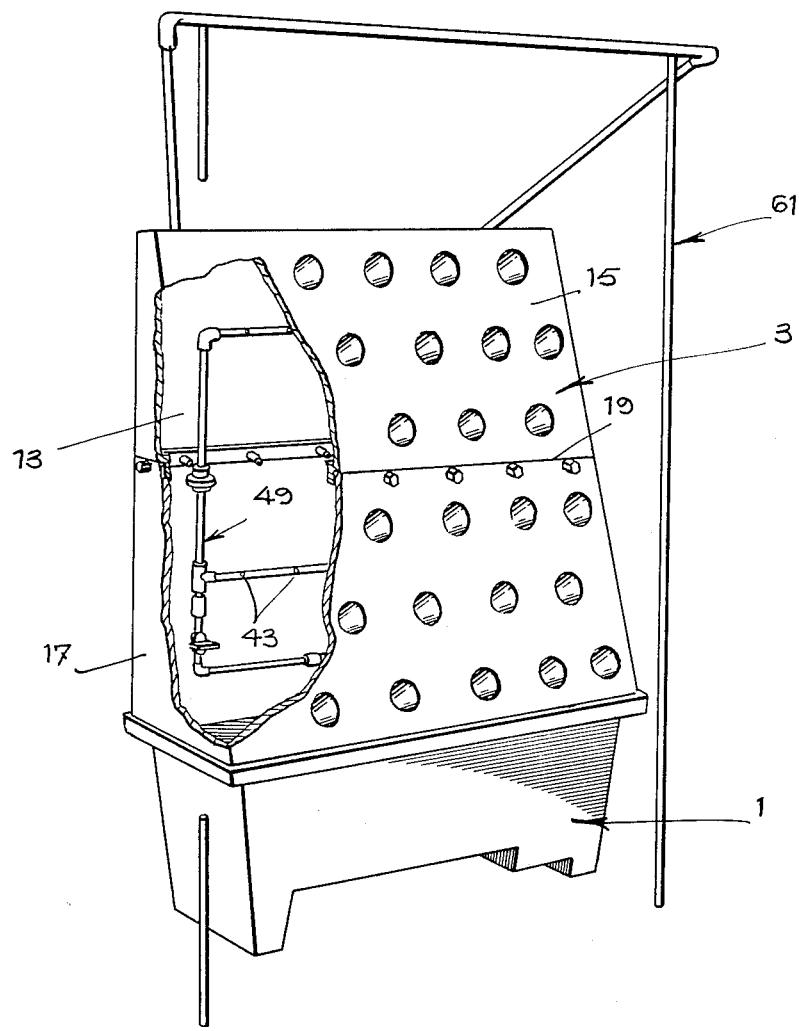
FIG. 1 is a perspective view, partly broken away, of an aeroponic apparatus made according to the invention.

Referring to FIGS. 1 to 4, there is shown an aeroponic apparatus made according to the invention which comprises a reservoir 1 for containing a liquid nutrient solution and a plant support 3 standing over the reservoir 1. The latter has a bottom wall, of which a major portion 5 slants toward a sump 7, and circumscribing upright sidewalls 9 defining a rectangle. The plant support 3 is essentially right-angular in shape, having a rectangular base adapted to stand over the upper peripheral edges of the reservoir sidewalls 9.

The plant support 3 is formed of a rectangular planar vertical back wall panel 13; a rectangular planar inclined hypotenuse front wall panel 15 and right-angular planar end wall panels 17 located between the wall panels 13, 15, at their end edges. For ease in transportation, walls 13, 15 and 17 may each come in two sections, releasably interlocked at their meeting edges by rabbet joints 19 (FIG. 3) or any other suitable joints providing the necessary watertightness and light-tightness. Additionally, this type of joint increases the resistance of the whole panels, in use.

The front and back panels 15, 13, are connected together at adjoining edges by any convenient means to provide the desired water and light tightness. The same applies to the interlocking of the lower edges of the plant support panels 13, 15, 17, and the upper edges of the reservoir 1.

Thus, both the back and front panels 13, 15, may be bent inwardly at their end edges to define connection flanges 21, as shown in FIG. 4, for panel 15. The edges of the end panels 17 are then applied over the inwardly bent flanges 21 and removably secured thereto, as by screws. Similarly, the top edge of the front panel 15 may be bent into a connection flange 23 (FIG. 3) secured to a like flange (not shown) of the back wall panel 13 by screws 25.

Figure 2:
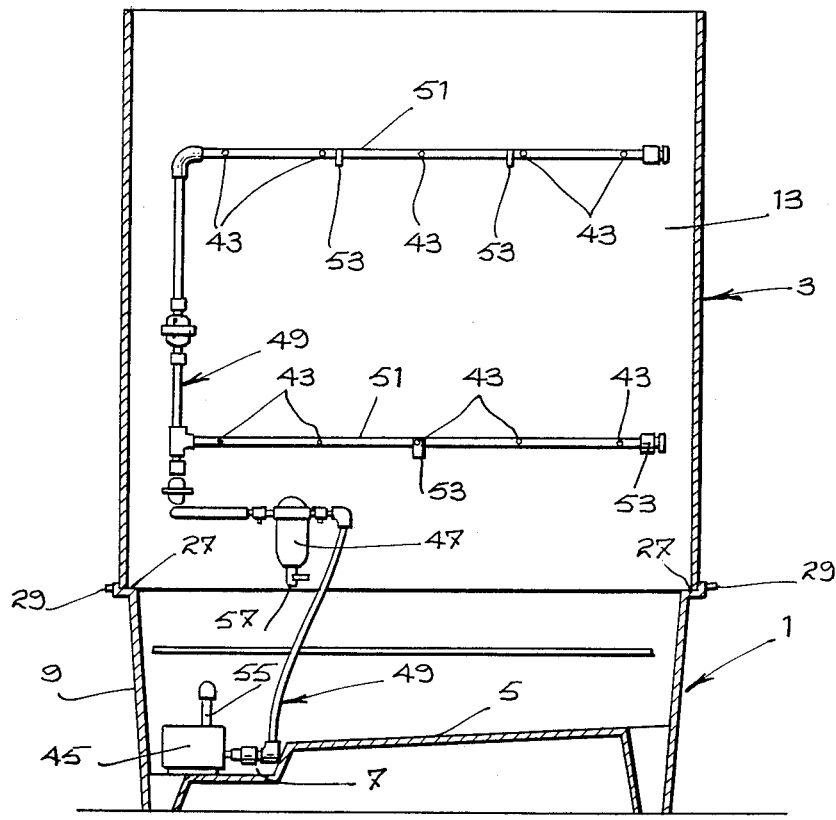
FIG. 2 is a vertical cross-sectional view taken in a plane immediately forwardly of the nutrient solution spraying system.

FIG. 2 shows the upper edges of the nutrient solution reservoir 1 to be formed with inwardly-looking rabbets 27 serving to receive the lower edges of the panels 13, 15, 17, which are releasably secured in the rabbets 27 by screws 29.

The reservoir 1 and panels 13, 15, 17 are preferably molded out of suitable white plastic or fiberglass material for light reflection back onto the plants.

As will be appreciated from the above description, such interlocking of the panels together and of the panels to the reservoir provides good structural resistance both to weight (particularly when the mature plants are supported by the front wall panel 15) and to wind, while restricting light penetration, thereby limiting algal growth within the enclosure 31. Easy access to this enclosure 31 is also possible simply by removing the front wall panel 15.

As shown in FIGS. 3 and 4, a plurality of cups 33 extend within the enclosure 31, preferably wholly therein, from the front wall 15, being inclined toward the reservoir 1 to properly drain excess liquid nutrient solution back to the reservoir thus avoiding that some of the solution seeps through the various connection joints to the outside and create unsightly algae. Both to strengthen the front wall 15 and further ensure that no such solution seeping occurs, the cups 33 are, according to the invention, molded integrally with the front wall panel 15. These cups are open-ended tubes each of which is adapted to snugly receive, in use, a plant 35 contained in a liquid-absorbent plant support medium 37. In a preferred form, medium 37 is a plug made of cellular material that could be foam rubber or foam plastic. Advantageously, the cups 33 are hollow frusto-cones with their small base located in the enclosure 31. Each plug 37 of cellular material is likewise frusto-conical in shape with the diameter of its small base exceeding that of the small base of the cup 33 into which it is snugly received so that friction created by expansion of the cellular material, as it is wetted, beyond the enclosure end of the cup, as shown in FIG. 4, will hold the plug within its cup.

Once the plants 35 have started to grow, their roots 41 will be held in the darkened enclosure 31; the plants being wholly on the outside.

The apparatus made according to the invention includes a liquid nutrient solution spraying system within the enclosure 31. It comprises: a plurality of spraying heads 43 distributed at different levels along the back wall 13 and operatively facing the plant holding cups 33 and roots 41; a pump 45 in the sump 7 of the reservoir 1; a filter 47 for cleaning the nutrient solution and conventional piping means 49 operatively joining the spraying heads 43, the filter 47 and the pump 45. The system is constructed to supply nutrient solution from the reservoir 1 to the spraying heads 43 under proper feed and pressure conditions. Preferably, the piping means includes two horizontal pipe branches 51 secured to the back wall 13, by brackets 53 for instance; the spraying heads 43 being fixed to these branches 51 in any known manner.

In operation, nutrient solution in the reservoir 1 is continuously fed to the spraying heads 43 by the pump 45 after being cleaned by the filter 47 to prevent clogging of the spray heads 43, particularly. The latter are strategically located on multiple levels to ensure that all plants receive an adequate supply of nutrient solution regardless of their root growth that, in apparatuses of the prior art, sometimes act as curtains for younger plants which have not yet developed elaborate root structures as compared to those of older plants.

As to the preferred presence of filter 47, lack of filtration of the feed solution would cause partial or complete clogging of spraying heads 43 resulting in loss of at least some of the plants due to root drying thereby greatly increasing care and operational maintenance due to the time required in disassembling and cleaning individual spraying heads 43.

As mentioned previously, a heater 55 may be included in the reservoir 1. It advantageously may serve three main functions: it holds the nutrient solution at an appropriate temperature and, during cool weather, permits the plant foliage, fruits or vegetables, to resist cool temperatures consequent to warming of the root structures; it provides night time heating when the apparatus is used as a greenhouse (as will be seen hereinafter) allowing extension of the growing season or, when the greenhouse apparatus is used in a solarium, the night time temperature in the latter may be reduced with the heater 55 which provides the necessary heat to hold the small volume of nutrient solution in the reservoir 1 and the enclosure 31 at an adequate temperature. As a third function, the heater 55 contributes to energy conservation considering that higher temperatures need not be maintained in the entire solarium or greenhouse.

Referring back to the spraying system, the latter is easily used for changing the nutrient solution. For this purpose, the front wall panel 15 is removed; a garden hose (not shown) is connected to the bottom 57 of the filter 47; a valve 59 of the piping means 49 shut off to cut off supply to the spraying heads 43 and the pump 45 operated to reject the old solution to waste through the hose.

As will have been gathered, it has not been necessary to provide wall drains which constitute a risk of leakage and consequently property damage. For that reason, the apparatus is quite fit for use in residences, even where floors are carpeted. Also, the sloping bottom 5 of the container 1, feeding into the sump 7, maximizes drainage without the need of any wall fitting. It has been found that the pump may thus remove as much as 99% of the old nutrient solution.

Figure 5:
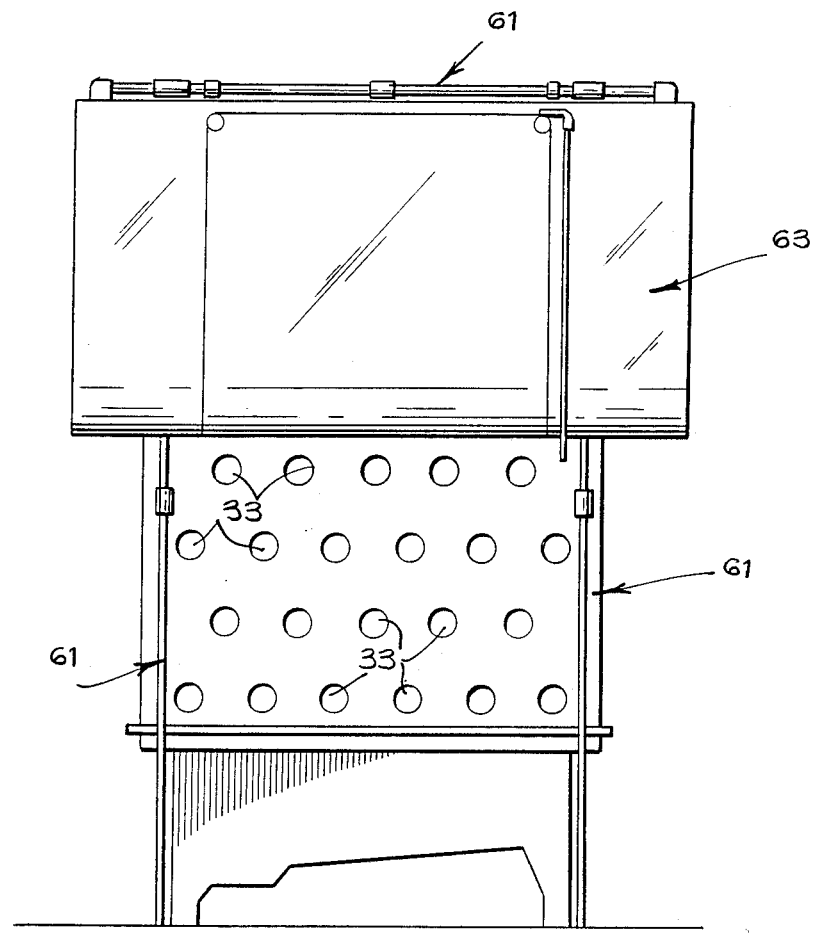
FIG. 5 is a front elevation view of the apparatus equipped with a windshield assembly.

FIGS. 3 and 5 show that the apparatus may be provided with a windshield assembly including an enclosure frame 61 which extends, as best illustrated in FIG. 3, above the back wall 13 and forwardly of the front wall 15. Frame 61 serves to support a rollable windshield 63, including a sheet of transparent flexible plastic material rollable, through an appropriate pulley system, between a position where it shields the front wall 15 from wind and a retracted position where it stands away therefrom. The sheet of plastic material may also be color tinted to guard against scorching sun.

On the other hand, the windshield 63 may be removed from the frame 61 and replaced by a covering sheet 65 of transparent flexible plastic material slid thereover to enclose the plant support 5 and the reservoir 1 on all sides whereby the apparatus and the sheet 65 act as a greenhouse. For good holding of the enclosure frame 61, the rear upright tubes 71 thereof may advantageously be secured to the back wall 13. In both cases, it is suggested that the apparatus be further weighed down by heavy base members 67 to which the reservoir and frame 61 are secured. Additional inclined struts 69 may be fixed to both the reservoir 1 and the base member 67 to add resistance against wind.

I claim:

1. A self-contained aeroponic apparatus comprising:
   a reservoir for containing a liquid nutrient solution, said reservoir having a bottom wall and upright circumscribing sidewalls, a major portion of said bottom wall slanting toward a sump;
   a plant support standing over said reservoir; said support comprising a rectangular planar vertical back wall; a rectangular planar inclined front wall and planar end walls located between said back wall and front wall at the lateral edges thereof;
   means releasably securing together, in essentially watertight and light-tight conditions, said back, front and end walls of said support;
   means releasably securing together, in essentially watertight and light-tight conditions, the lower edges of said support and adjoining upper edges of said reservoir; said reservoir and said plant support defining an enclosure;
   a plurality of hollow, open-ended, frusto-conical cups wholly projecting within said enclosure from said front wall exclusively, said frusto-conical cups having their small bases located in said enclosure and being inclined toward said reservoir whereby to ensure self-drainage of surplus nutrient solution back to said reservoir, said cups being formed integrally with said front wall and each adapted to hold, in use, a plant held by a plant support medium consisting of a frusto-conical plug made of a liquid absorbent cellular material selected from the group consisting of foam rubber and foam plastic, the diameter of the small bases of said frusto-conical plugs exceeding that of the small bases of said frusto-conical cups whereby friction, created by expansion of said cellular material beyond the small base ends of said cups, holds said plugs within said cups; and a nutrient solution spraying system within said enclosure, said system comprising a plurality of spraying heads distributed at different levels along said back wall and operatively facing said plant holding cups, a pump located in the sump of said reservoir, piping means operatively joining said spraying heads and said pump and a nutrient solution filter operatively mounted between said pump and said spraying heads; said system being constructed to supply nutrient solution from said reservoir to said spraying heads; and a heater mounted in the reservoir to hold the nutrient solution at an appropriate temperature.

2. An apparatus as claimed in claim 1, wherein said piping means comprise two horizontal pipe branches secured to said back wall; said spraying heads being mounted on said pipe branches.

3. An apparatus as claimed in claim 1, further comprising, in each of said cups, a support medium and a plant supported by said medium.

4. An apparatus as claimed in claim 1, further comprising a greenhouse enclosure frame extending above said backwall and forwardly of said front wall, and a transparent plastic sheet slid over said enclosure frame and wholly enclosing said plant support and reservoir to form therewith a greenhouse.

5. An apparatus as claimed in claim 1, further comprising a windshield assembly including an enclosure frame extending above said backwall and forwardly of said front wall, and a rollable windshield made of transparent flexible plastic material rollable between a position shielding said front wall and a retracted position away from said front wall.

6. An apparatus as claimed in claim 2 wherein said horizontal pipe branches are vertically spaced on said back wall.

* * * * *